(12) United States Patent  
Erickson et al.

(10) Patent No.: US 7,925,735 B2  
(45) Date of Patent: Apr. 12, 2011

(54) NETWORK-BASED APPLICATION LATE BINDING

(75) Inventors: Richard Erickson, Farmingdale, NJ (US); Gilbert J. McGrath, Middletown, NJ (US); Reuben Klein, East Brunswick, NJ (US)

(73) Assignee: AT&T Intellectual Property I, L, Atlanta, GA (US)

( * ) Notice: Subject to any disclaimer, the term of this patent is extended or adjusted under 35 U.S.C. 154(b) by 182 days.

(21) Appl. No.: 12/337,577

(22) Filed: Dec. 17, 2008

(65) Prior Publication Data

US 2010/0153530 A1  Jun. 17, 2010

(51) Int. Cl.  
*G06F 15/173* (2006.01)  
*G06Q 10/00* (2006.01)  
*G06F 17/30* (2006.01)

(52) U.S. Cl. .................. 709/223; 705/1.1; 707/999.009

(58) Field of Classification Search .................. None  
See application file for complete search history.

(56) References Cited

U.S. PATENT DOCUMENTS

| | | | |
|---|---|---|---|
| 7,100,195 B1* | 8/2006 | Underwood | 726/2 |
| 2004/0177360 A1* | 9/2004 | Beisiegel et al. | 719/316 |
| 2007/0255719 A1* | 11/2007 | Baikov et al. | 707/10 |
| 2007/0288247 A1* | 12/2007 | Mackay | 705/1 |
| 2008/0091682 A1* | 4/2008 | Lim | 707/9 |
| 2008/0313029 A1* | 12/2008 | Evans | 705/14 |

* cited by examiner

*Primary Examiner* — Wen-Tai Lin

(57) ABSTRACT

The claimed subject matter provides late network binding functionality to network or web-based applications or services. An application gateway component exposes generic interfaces for different types of network applications allowing client application developers to utilize generic functionality. Client applications can invoke the generic interfaces, at which point the application gateway component can determine contextual information related to the end user. Using the contextual information, the application gateway component can perform late network binding to a network or web-based application or service by generating and transmitting a request thereto based at least in part on the generic interface invocation and user context. The contextual information can include explicit binding information or data that can be utilized to determine or infer binding preferences.

20 Claims, 12 Drawing Sheets

NETWORK-BASED APPLICATION LATE BINDING

BACKGROUND

Advances in computer technology (e.g., microprocessor speed, memory capacity, data transfer bandwidth, software functionality, and the like) have generally contributed to increased computer application in various settings. For example, computers are in many homes across the country and the world allowing users to interconnect over a virtual space by communicating through email, internet phone, instant messaging, and/or the like. Media is also shared among computer users, such as photos, videos, audio, etc. In addition, cellular phone and related network technology has similarly advanced facilitating the performance of many of the same functions over a portable device, which allows users to remain connected even when absent from a computer. Whether on computer or cellular phone (or other similar devices) and regardless of the supporting network (Internet, Wi-Fi network, conventional telephone network, cellular network, wireless mesh network, etc.), the foregoing functionality is provided through applications that execute on the computer and/or cellular phone. The applications can be standalone applications and/or can be executed using features of a general purpose application, such as a web browser, for example. More recently, services can be provided through the World Wide Web allowing the computers, cellular phones, etc. to receive remote services from a variety of providers, such as gaming, photo printing, stock trading, bank account management, health information management, and/or substantially any imaginable service.

On a different front, computers, cellular phones, etc., can provide local application binding, which allows applications to be bound to different file types facilitating simplified handling of files in an operating system executing on computers, cellular phones, etc. Typically, the computer, cellular phone, etc. maintains a list of the bindings such that upon requesting files or data of a certain type, the computers, cellular phones, etc. can invoke the appropriate application to allow opening and/or manipulation of the requested files or data such that the user need not perform the individual steps of finding the data, manually opening an appropriate application, and utilizing that application to manipulate the specific files or data. In addition, the user can select which applications should be utilized when opening different types of files. Thus, a user can have multiple applications that handle a certain type of file, but can prefer one application such that only that application would be used to open that particular type of file.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to providing network-based late binding for applications executing on devices such as computers, cellular phones, etc. In particular, binding for network-based applications and/or services can be provided for given user or device profiles, capabilities, and/or the like. According to an example, an application gateway can be utilized to create a binding of generic network application type requests to specific network or web-based applications or services. In this regard, application developers can utilize generic interface models to provide functionality for multiple specific network or web-based applications or services. The application gateway can receive invocations of the generic interface, determine a context for the request, and select an appropriate binding to a specific network or web-based application or service.

The context, for example, can relate to explicit binding configurations requested by a user, data from which binding preferences can be inferred (such as browsing history, demographic information, environmental information, etc.), provisioned data associated with a service subscription, and/or the like. In this regard, different devices and/or applications operated by a single user can result in the same bindings for a given generic application type, as described herein. In addition, the application gateway can expose available generic interfaces to facilitate developing applications that leverage the interfaces as well as to allow for registration of specific network or web-based applications or services for subsequent binding thereto. Also, in one example, functionality can be leveraged on the client to provide intuitive bindings, as described in further detail below.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
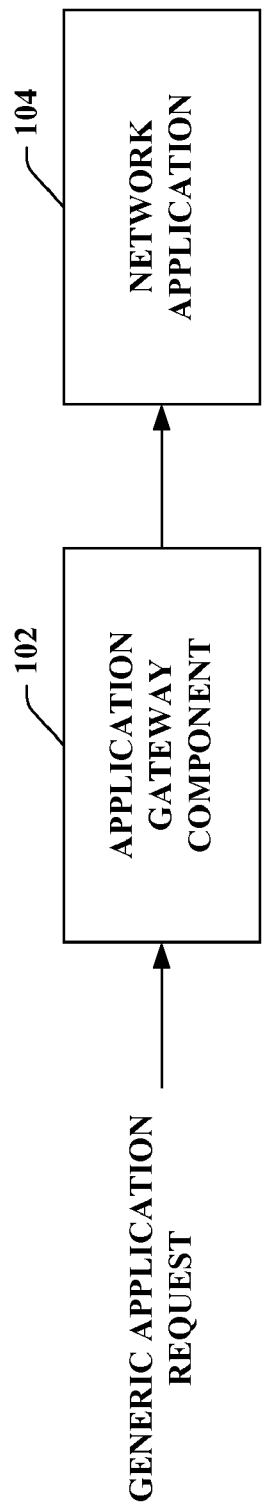
FIG. 1 illustrates a block diagram of an exemplary system that facilitates binding generic application requests to specific network applications.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "data store," "engine," "template," "manager," "network," "profile," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates late network-based binding of generic application requests to specified network applications, such as web-based applications or services. The system 100 comprises an application gateway component 102 that manages late network bindings related to one or more application requests coming from one or more network users. The network application 104 can be one of a plurality of network or web-based applications or services that can receive input forwarded from the application gateway component 102. For example, the application gateway component 102 can receive a generic application request as input, determine a binding for the generic application request based on a context, in one example, and forward the generic application request to the network application 104 based on the binding. Binding can refer to translation of a received service request to a specific service or application based upon a mapping to the service or application at the time when requested service is to be provided. Thus, late binding can be provided for network or web-based applications and services where the binding occurs late in application development (e.g., once applications are developed and executing), and occurs over a network to one or more network-based applications or services.

According to an example, the application gateway component 102 can configure an application type for allowing associated binding. The application gateway component 102 can expose a generic interface for the application type and communicate with one or more network applications 104 based on invocation of the generic interface (e.g., by the generic application request). For example, the application gateway component 102 can implement and/or expose a generic interface for an application type related to online photo printing. In one example, the generic interface can include functions to upload photos, view photos, print photos, delete photos, and/or similar functions typically provided by online photo printing services. The application gateway component 102 can access appropriate routines on a variety of specific network or web-based applications or services, such as network application 104. Various network applications can include, for example, different photo printing web services. In another example, the network application 104 can include implemented routines that are registered with the application gateway component 102 to shift the development burden to the network application provider.

In this regard, the application gateway component 102 can receive a generic application request for at least one of the foregoing photo printing functions and can determine a binding for the generic request. For example, the binding can be based at least in part on one or more aspects of the generic application request, such as a source of the request, data comprised within the request (e.g., an explicit indication of the binding, information used to discern the binding, and/or the like), one or more specifications or capabilities of the source, historical data related to the source, etc. Using the binding data, the application gateway component 102 can generate a specific request to the network application 104 in response to the generic application request and information related thereto.

For example, a client application can be developed to utilize general photo printing functionality. The application can invoke the generic interface, for example, to upload photos to a desired photo printing web service or other generic application requests, as shown. Using additional information, the application gateway component 102 can forward the request to a desired or preferred network application 104 by determining a binding such that the application invoking the generic interface need not develop functionality dependent upon any specific photo printing service. Thus, applications can be written that invoke the generic interface exposed by the application gateway component 102, and the application gateway component 102 provides late network and/or web-based bindings to the applications. This allows preferred network and/or web-based applications or services to be utilized by client applications such that the client need only implement generic functionality related to the network and/or web-based application or service type.

Figure 2:
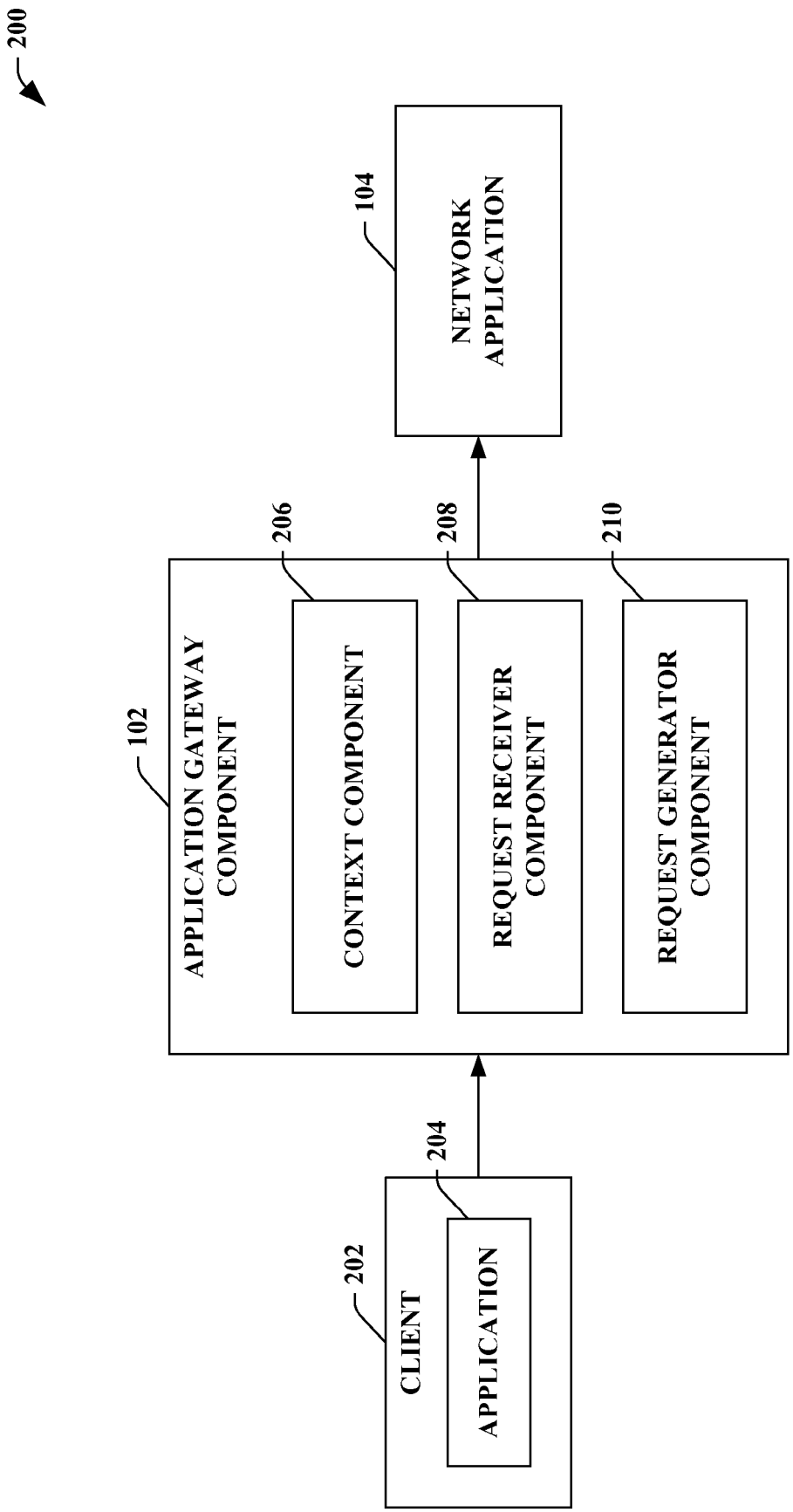
FIG. 2 illustrates a block diagram of an exemplary system that facilitates binding generic application requests from a client to specific network applications based on a context of the client.

FIG. 2 illustrates a system 200 that facilitates generating late binding network application requests based on generic requests and related context. The system includes a client 202 that executes an application 204 and communicates with an application gateway component 102 to receive late network binding to one or more network applications 104. The application gateway component includes a context component 206 that can receive a context related to the client 202, a request receiver component 208 that can receive a generic interface call or request from the client 202, and a request generator component 210 that can formulate a specific network application 104 request from the received request and context information. The client 202 can be substantially any device connected to a network, such as a personal computer, server, personal digital assistant (PDA), cellular phone, smart phone, media player, digital video recorder (DVR), gaming console, router, network bridge, network gateway, printer, projector, scanner, camera, and/or the like. The client 202 can participate in substantially any type of network, including a wired or wireless local area network (such as Ethernet, Wi-Fi (IEEE 802.11b), etc.), wide area network, cellular network (such as a third generation partnership project (3GPP) network, global system for mobile communication (GSM), general packet radio service (GPRS), etc.), Bluetooth, radio frequency identification (RFID) network, or similar close quarters network technology, and/or the like.

In one example, the application gateway component 102 can be communicatively coupled to the client 202. For example, the application gateway component 102 can be provided by an Internet service provider (ISP) and present within a related device, such as a modem, router, and/or the like. In another example, the application gateway component 102 can additionally or alternatively be stored remotely from the client 202 and still provided by the ISP. It is to be appreciated that providing the application gateway component 102 at the ISP, in either embodiment, allows the application gateway component 102 to act as a gatekeeper for network applications providing efficient user authentication and context augmentation functions in a central place. Thus, the authentication and context augmentations need not be maintained at the network applications. Moreover, providing the application gateway component 102 remotely from the client 202 allows for centralized storage of late network binding information regardless of the type of client 202 utilized. Thus, where a single user has a personal computer and cellular phone connecting to the application gateway component 102 via disparate access network, the same binding information can be utilized by the application gateway component such that, for example, photos taken by the cellular phone and photos loaded onto the personal computer can be uploaded to the same online photo printing service. In another example, the application gateway component 102 can be part of a web server such that a user can request binding using an application operating as part of the web server, initiating a request to the web server, such as a hypertext transfer protocol (HTTP) request, and/or the like.

According to one example, the application gateway component 102 includes a context component 206 that can receive or determine a context related to the client 202. For example, the context can relate to information received about the client 202, which can be established by the client 202 through configuration, received in a request related to the generic interface, determined from mining information related to the client (such as browsing history or other information obtainable by an ISP), and/or the like. The context can be utilized to direct the gateway, for example, as to the appropriate late network bindings to be utilized for various types of network applications; the context can be explicitly specified and/or inferred, for example. In one example, the context can be a default context defined by the application gateway component 102 (e.g., the default context can be used when a context is not specified and/or cannot be inferred). In addition, the request receiver component 208 can receive a generic interface request from the client 202. In one example, the request can be generated from the application 204 executing on the client. The request can relate to functionality provided by the application that is selectable by the user; in another example, the request can relate to an intercepted application command determined by an event listener (not shown). Moreover, the request can relate to a network request intercepted by the application gateway component 102, for example by network sniffing for certain outgoing network requests.

Using the context, the request generator component 210 can create a request specific to a network application 104 based on the context received or determined by the context component 206 as well as the request received by the request receiver component 208. For example, the application 204 can allow a user to manage bank accounts and pay bills online. The application gateway component 102 can provide a generic online bill paying interface, for example, that exposes functionality for transmitting payment to a payee, viewing history of payments, managing payees, and/or the like. The application gateway component 102 can implement specific functionality behind the generic interface that facilitates performing the functions at various banking websites, which correspond to network applications 104. As mentioned, in another example, the banking websites (network applications 104) can implement routines that are registered with the application gateway component 102 to put the onus on the bank to provide the backend functionality.

In this example, a user can pay a bill using the application 204; the application 204, in turn, generates a call to the generic bill pay interface provided by the application gateway component 102. The request receiver component 208 obtains the request from the application 204, and the context component 206 determines information related to the request, the client 202, and/or the like, as described. In one example, the client 202, and/or a user thereof, can have previously configured binding information for bill pay type applications, in the application gateway component 102, to a given preferred banking website network application 104. The request generator component 210 then generates a request to the appropriate banking website network application 104 based on the context and received request. In one example, where the binding was explicitly specified in a previous configuration step, the request generator component 210 can determine the binding, accordingly create the appropriate request, and transmit the request to the banking website network application 104. Thus, the late network binding saves the application 204 from having to develop functionality for the many banking websites; rather, the application 204 need only implement generic functionality, and the application gateway component 102 handles user or context specific functionality.

Moreover, centralizing the application gateway component 102, e.g., as accessible over one or more networks, allows clients related to a user to utilize the same bindings. Thus, in one example, the client 202 can be a personal computer that executes an application 204 allowing banking website interaction, as described above. In another example, however, the client 202 can be a cellular phone utilized by the same user also having a different application 204, as appropriate to the smaller portable client device 202, that provides access to banking website functionality. For example, the user on-the-go may have forgotten to pay a bill at home. The application 204 that executes on the cellular phone can similarly be utilized to invoke the generic bill pay interface of the application gateway component 102. The request receiver component 208 similarly receives the generic bill pay request, and the context component 206 determines the context, which can relate to identifying the user of the cellular phone based on various aspects. Again, where the application gateway component 102 is a cellular service provider, the information is easily obtained through network connectivity parameters. In either case, based on the identification, the request generator component 210 can determine the appropriate banking website network application 104 and accordingly generate and transmit the request. Thus, users need not configure separate applications on multiple clients to receive bill pay functionality bound to its preferred network application.

In yet another example, the application 204 can generate a request to the application gateway component 102, which can act as a broker in determining late network binding. For example, the application 204 can be a web browser which resolves universal resource locators (URL), related to a web services provider, such as "http://www.att.com" to receive a corresponding web page. Furthermore, a user of the browser can reference a desired service coupled with the provider via conventional domain name mapping (DNS), such as "mallshopping.att.com" to indicate the desire to browse for mall shopping websites in physical proximity to the user. In an alternative embodiment, the application 204 can receive desired actions as input. For example, the user can type a phrase, such as "mall shopping" in a search box and/or the like. In one example, the search box can be on a web page associated with the application gateway component 102. In another example, the input to a search box of an independent search engine can resolve to a URL such as http://mallshopping.att.com. In either case, the request receiver component 208 can determine the desired service, the context component 206 can determine an appropriate context related to the desired service, and the request generator component 210 can determine a late network binding related to the desired service and the context, transmitting a request to the appropriate network application 104 (e.g., a mall directory website desired by the user as indicated in pre-configuration, as described, or inferred from other context related data such as the location of the user or through a service agreement between an ISP and a particular mall directory store website).

Figure 3:
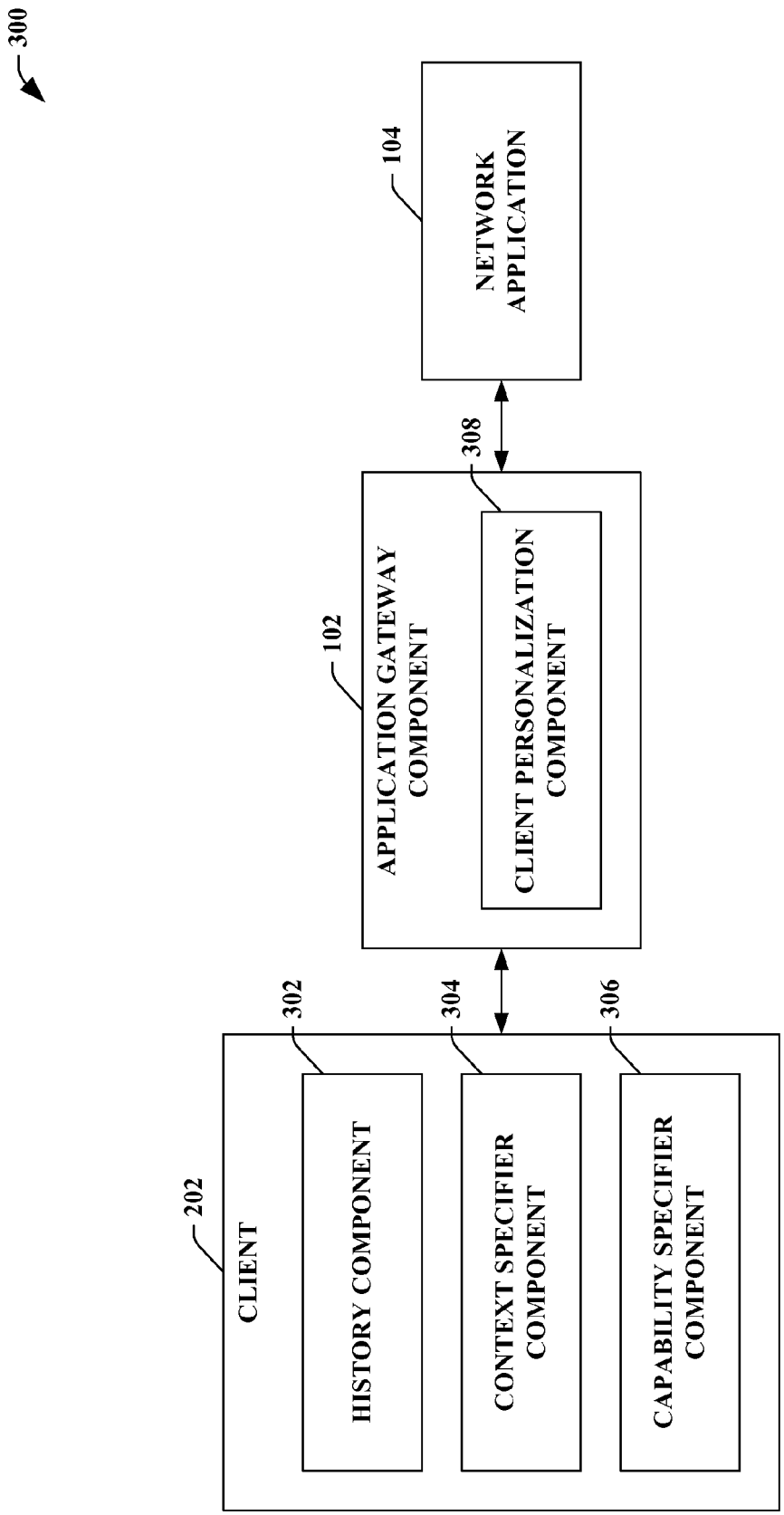
FIG. 3 illustrates a block diagram of an exemplary system that facilitates leveraging client capabilities in providing intuitive late network bindings.

Now referring to FIG. 3, a system 300 that facilitates client-based context determination and capability feedback is illustrated. The system 300 includes a client 202 that communicates with an application gateway component 102 to receive late network binding functionality, as described supra, to one or more network applications 104. The client 202 includes a history component 302 that can mine specified current and/or historical information about the client 202, or a user thereof, a context specifier component 304 that can determine and specify a context based at least in part on the historical data, and a capability specifier component 306 that can indicate one or more capabilities of the client 202. The application gateway component 102 can include a client personalization component 308 that can utilize one or more of the indicated capabilities on the client 202 to provide added value related to the late network bindings, as discussed below.

According to an example, the history component 302 can analyze data related to the client 202 or a user thereof that can be utilized to determine a pattern of prior activity, which can be utilized as described above. The data that can be analyzed is substantially limitless and can include metadata from a variety of sources related to the client 202 and/or a user thereof. For example, the history component 302 can analyze data related to one or more aspects of a user profile (such as demographic, residence location, possessions, financial status, etc.), browsing history (including answers mined from real-time transaction, such as recent searches, street or billing addresses, etc.). The context specifier component 304 can additionally analyze data such as real-time user location (e.g., as determined from a system accessing location, global positioning system (GPS), etc.), biofeedback (e.g., information regarding a user's physical condition), environmental data, such as air temperature, time of day, and/or the like. The context specifier component 304 can indicate a context to the application gateway component 102, based on the historical and contextual data, which can be utilized to determine appropriate binding information based on a related request.

For example, via an application executing on the client 202, a brokered web service, a search engine specification, and/or the like, a user can specify that it desires to purchase clothing. The history component 302 can analyze data such as prior purchase history, and generate supplementary information relevant to the purchase request related to the history. The historical data can include one or more previous store identifiers, in one example, which the application gateway component 102 can utilize to connect the client 202 with the store as a late network binding based on the generic request. Moreover, the context specifier component 302 can analyze additional data related to weather in an area where the user resides. Context generated from this information can be utilized, for example, to determine which department or items in the store may interest the user most. The application gateway component 102 can choose an appropriate department or items in the store for binding the client application 202 based on this contextual information.

Moreover, in one example, a capability specifier component 306 can indicate one or more capabilities of the client 202 to the application gateway component 102 that can be utilized in the late binding. The client personalization component 308 can use the capability along substantially any step in providing the late binding functionality. For example, the client 202 can have capabilities related to GPS that allow for real-time location determination and specification. Upon requesting clothing, as in the example above, the application gateway component 102 can bind the client 202 to a network application 104 related to a clothing store. The client personalization component 308 can then utilize the GPS functionality to determine a current location of the client 202 and can provide a store location near the client 202 to purchase and/or pickup purchased clothing, for example. In another example, the client personalization component 308 can utilize the GPS capability to determine a location of the device 202 upon determining an appropriate binding. In this regard, in the clothing example, stores not in the area can be ignored, and the application gateway component 102 can choose network application 104 bindings that are relevant to the GPS location.

In another example, the capability specifier component 306 can also indicate specific application choices specified by users for types of network applications. For example, if the end user desires a specific photo sharing application, the user can establish that in a related client device, such as device 202. Applications on the device 202 can pass the selected specific application as a optional parameter to the application gateway component 102, in one example. In this regard, for example, the application gateway component 102 can override late network bindings determined as described above with specific applications indicated by the capability specifier component 306.

In yet another example, the client personalization component 308 can detect voice over internet protocol (VoIP) capability on the client 202 and read catalog information to a user of the client 202 (e.g., where the client personalization component 308 additionally detects absence of a display or otherwise) or allow connect a user of the client 202 with the store using the VoIP functionality. Thus, the client personalization component 308 can provide additional functionality based on client 202 capabilities for an intuitive late network binding related experience.

Figure 4:
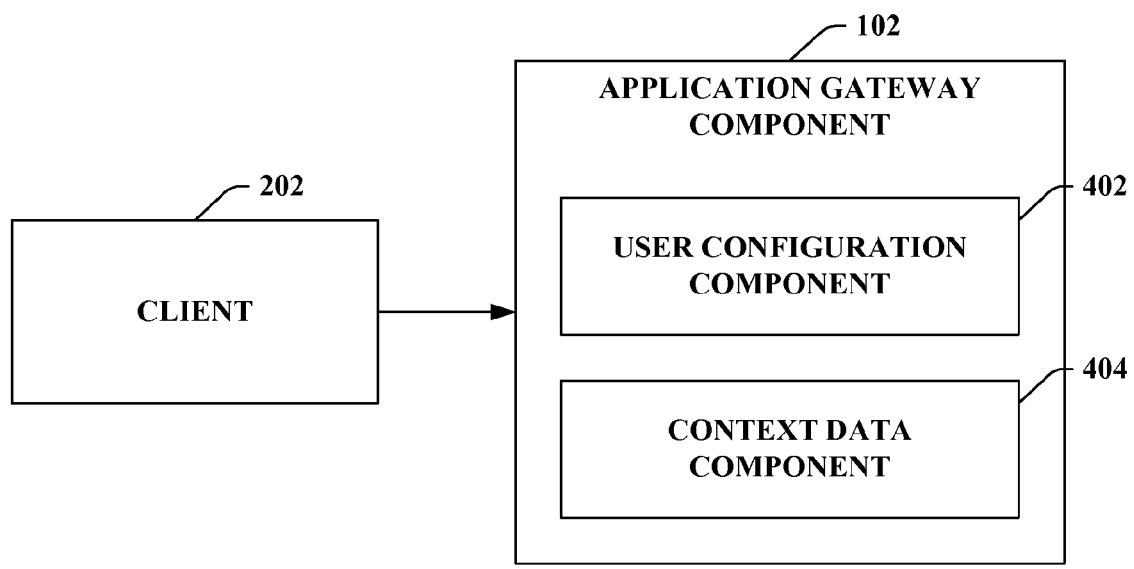
FIG. 4 illustrates a block diagram of an exemplary system that facilitates allowing clients to configure preferred bindings and/or information from which bindings can be inferred.

Turning now to FIG. 4, displayed is a system 400 that facilitates configuring an application gateway component 102 for providing late network binding functionality for a variety of network or web-based applications and services. The system comprises a client 202 that communicates with an application gateway component 102 to receive late network binding as described herein. The application gateway component 102 comprises a user configuration component 402 that can be utilized to specify binding preferences and/or other information related to a user of the client 202 and a context data component 404 that creates a context to facilitate late network binding, as described, based on information from the user configuration.

According to an example, the client 202 can interact with the user configuration component 402 to establish late network binding preferences. For example, the client 202 can be utilized to provide the user configuration component 402 with explicit binding preferences, such as selecting desired network or web-based applications or services corresponding to application types. In addition, the client 202 can provide the user configuration component 402 with other information regarding the desired binding, such as authentication credentials, configuration parameters related to the selected applications or services, and/or the like. Furthermore, the client 202 can provide the user configuration component 402 with information regarding the client 202 and/or a user thereof. The information can relate to one or more aspects of a user profile, client 202 functional capabilities, client 202 specifications (e.g., performance metrics), and/or the like, for example.

In another example, the user configuration component 402 can infer the foregoing information based on one or more aspects related to the client 202. For example, where the application gateway component 102 resides at an ISP for the client 202, the user configuration component 402 can collect browsing requests and can determine information regarding the client 202 and/or user thereof, such as desired network or web-based applications or services, etc. The context data component 404 can utilize information from the user configuration component 402 to create a context for subsequent application bindings. As described, the context can relate to an implicit or explicit application binding for a given application type related to a received request.

Figure 5:
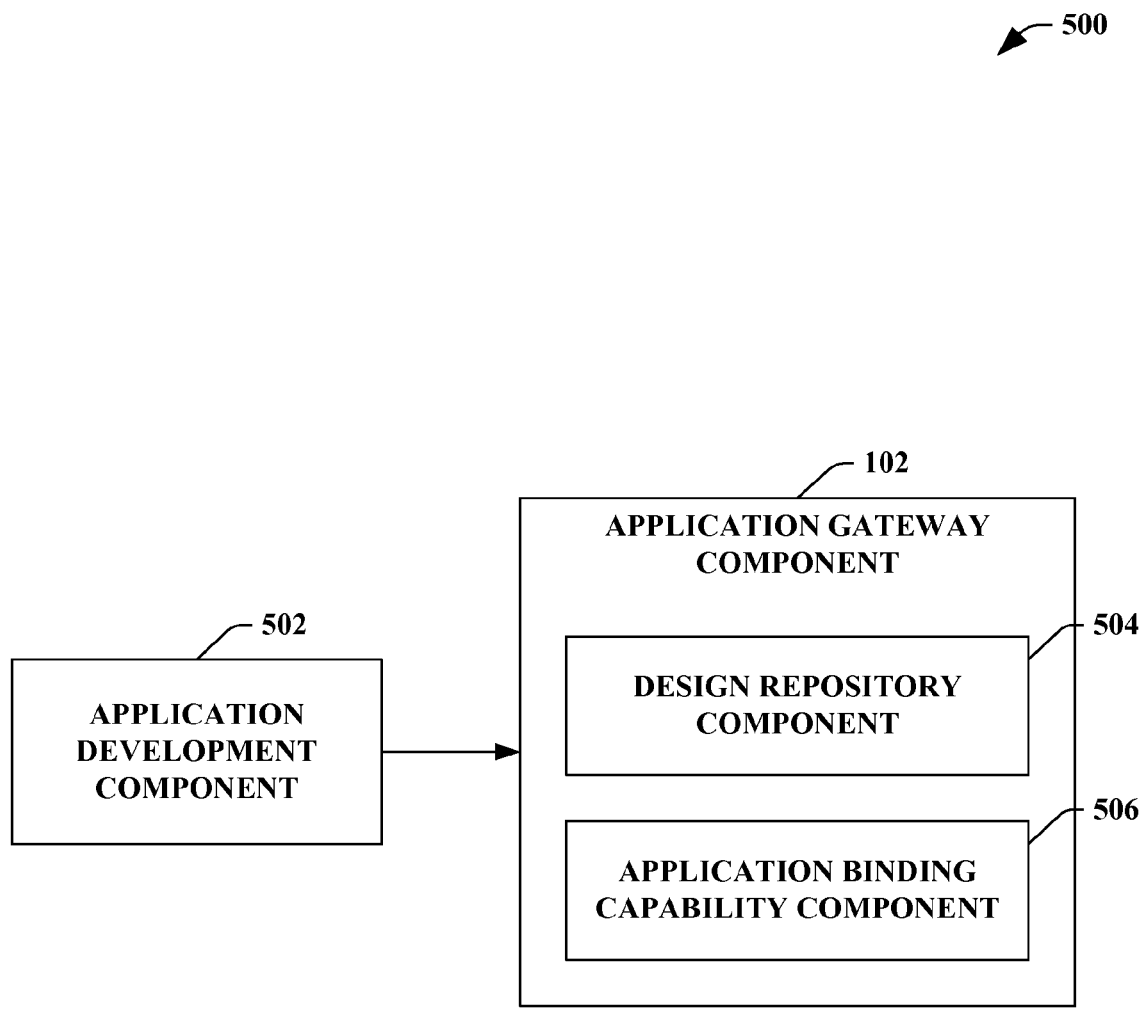
FIG. 5 illustrates a block diagram of exemplary system that facilitates developing applications that can communicate with an application gateway.

FIG. 5 illustrates a system 500 that facilitates developing applications for utilization with the application gateway component 102. The system includes an application development component 502 that can implement applications, which utilize generic interfaces available in the application gateway component 102 and/or register routines callable by the application gateway component 102 to provide late network bindings to the application development component 502 and/or a related system. The application gateway component 102 comprises a design repository component 504 that maintains a listing of application types for which generic interfaces are implemented as well as indication of the interfaces themselves. The application gateway component 102 also contains an application binding capability component 506 that can register routines from an application development component 502 for providing binding thereto.

According to one example, the application gateway component 102 can implement generic interfaces for a variety of generic network application types, such as bill pay applications, photo printing applications, and the like, as described above. The application development component 502 can leverage the design repository component 504 to obtain information regarding available interfaces, such as the application types available and/or listings of the interface specifications. In this regard, for example, the application development component 502 can implement a new client application utilizing the generic interface to provide network application type functionality without implementing specialized routines to communicate with a plurality of existing network or web-based applications or services. Thus, the application development component 502 leverages the application gateway component 102 by first inspecting and later utilizing the generic interfaces to provide late network binding. The application gateway component 102, as described, can receive the interface invocations, determine related context(s), and bind the request to a specific network application by communicating with substantially any compliant network application to provide the functionality indicated by the generic interface invocation.

According to another example, the application development component 502 can be the network or web-based application or service, as described. In this regard, the application development component 502 can leverage the design repository component 504 to determine methods exposed by the application gateway component 102 for generic functionality. The application development component 502 can implement network application routines, in one example, and register the routines with the application gateway component 102 to establish bindings to the generic functionality. It is to be appreciated that the routines can be required to conform to a specification or description (such as a web services description language (WSDL) definition, in one example). In addition, the application development component 502 can provide identification information (e.g., a website name or trade name) allowing the application gateway component 102 to determine when to map generic calls to that particular instantiation of the application development component 502. The application gateway component 102 can subsequently map generic interface invocations to the registered routines where the network application is chosen based on context, as described. This puts the onus on the network application provider to develop applications that interface with the application gateway component 102. In another example, the application gateway component 102 can implement the specific routines for one or more network applications that map to the generic interface. This can be accomplished by utilizing interfaces exposed by the network application, for example.

Figure 6:
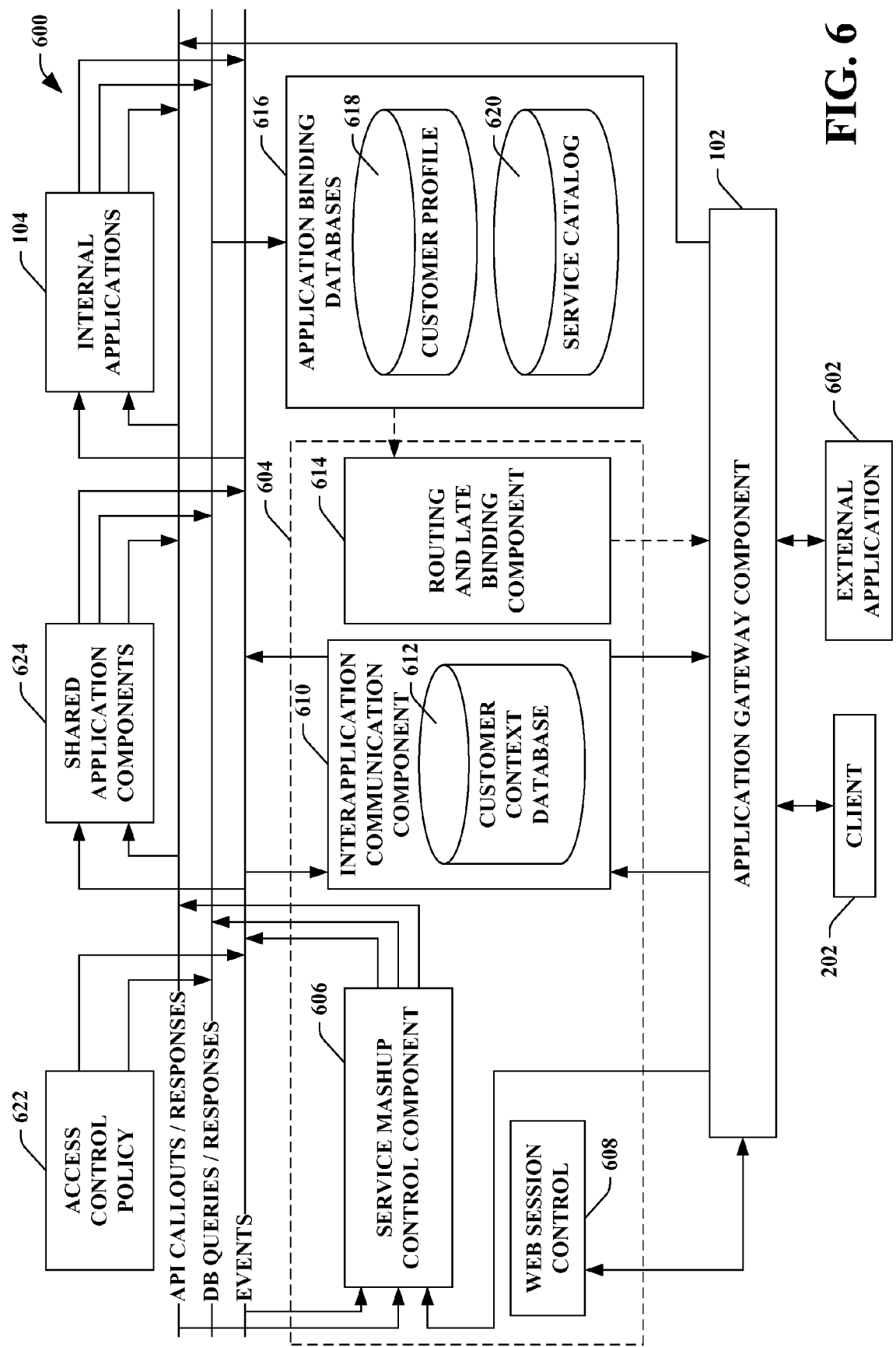
FIG. 6 illustrates a block diagram of an exemplary system that employs an application gateway to provide late network binding functionality.

FIG. 6 illustrates a system 600 that provides late network bindings to one or more applications based on utilization of a generic interface and a related context. The system 600 includes a client 202 and/or external application 602 that receive late network binding for generic requests from an application component 102. Moreover, the system 600 includes an architecture 604 with which the application gateway component 102 can communicate to provide the late network binding functionality. The architecture 604 can include a service mashup control component 606 that handles callout processing, such as data transformation, conditional branching and the like, to implement complex service definitions and dependencies such as combinations of internal applications 104, and shared application components 624 with external applications 602. The architecture 604 also includes a web session control 608 that allows the application gateway component 102 to establish a session with the client 202 so that client credentials can be presented only to the application gateway 102 and utilized for any subsequent network application bindings to achieve a single sign-on capability and avoid individual credential challenges from external applications. The architecture 604 also contains an interapplication communication component 610 that can receive event subscriptions from various applications, notify the applications when the event is published by another application, and respectively provide storage and viewing of a customer context database 612 based at least in part on the notifications. Moreover, the architecture 604 can comprise a routing and late binding component 614 that can route generic application requests to one or more internal applications 104, external applications 602 or service mashups 606 to perform binding thereto.

The routing and late binding component 614 facilitates routing and/or late binding by reference to a set of application binding databases 616 which are provided, including a customer profile database 618 and/or a services catalog database 620, which can store profile and catalog data from which generic application requests received from a client 202 can be mapped to specific application interfaces. Also, access control policy 622 rules are employed to limit access by specific customers to specific applications and events. According to an example, the application gateway component 102 can create a session with the client 202 using the web session control 608; thus the application gateway component 102 can establish an identity for the client 202 to know which applications to invoke upon receipt of a generic application request from the client 202 and subsequently to connect with multiple backends to provide the described functionality. The external application 602, for example, can be invoked by a generic interface call, as described herein, on the application gateway component 102. The application gateway component 102 can determine a generic application type and determine if it knows the appropriate binding defined for the particular client device and customer according to rules defined in the application binding databases 616; if so, it can transmit a command to the appropriate application or mashup, as described.

The customer context database 612 can be queried, in one example, to determine a context of the user related to an external application 602, an internal application 104 or a service mashup 606 of either application type with shared application components 624, as described. This context can be a history of published events to the interapplication communication component 610, as shown (the application gateway component 102 can perform this without the service mashup control component 606, in one example). Once appropriate information is gathered, an application can alter its internal behavior as appropriate to the context, publish a new event via the application independent signaling mechanism 610 which will cause another application to be notified, or generate a new generic request via the application gateway 102. In the latter case, the routing and late binding component 614 can determine an appropriate binding for the generic call based on information contained in the application binding databases 616 and transmit the information to the external application 602, in one example. The application gateway component 102 can also perform a different binding by transmitting a command to the internal application 104, as described, and/or an appropriate service mashup 606 which may invoke some shared application components 624, for example.

According to another example, the application binding databases 616 can be utilized to form a context and/or binding related to a user and type of the external application 602. For example, the customer profile database 618 can comprise information regarding the user including home address, circuit location, demographic information, age, etc., and where the application gateway component 102 relates to an ISP, it can also comprise information related to the Internet service, such as package level, account number, payment history, and/or the like. As described, this information can be utilized to determine a set of preferences associated with the user, which can comprise explicit application bindings or information from which implicit bindings can be determined. In one example, the user preferences can comprise a binding based on one or more service providers analyzed from prior browsing history and stored in the customer profile database 618. The analysis can be achieved by reviewing data found in the customer context database, in one example. Moreover, one or more access control policies 622 can be utilized to create a preferred binding from such context data. In one example, this can include limiting users from binding to an internal application 104 based upon location information associated to the application. For example, an access control policy 622 can specify to only allow binding to a certain online photo provider depending on a location of the user related to the context to prevent possible binding where the user is not in an area serviced by the provider.

In yet another example, the client 202 can access the application gateway component 102, as described, to configure preferences for a user. For example, the user can specify explicit application bindings and/or information from which bindings can be inferred, as shown supra. The bindings, in one example, can be specified in profile information provided by the client 202 and stored in the customer profile database 618 for subsequent context determination, as described.

Moreover, the external application 602 can communicate with the application gateway component 102 in a development phase to obtain listings of available application types for which generic interfaces are implemented. This information, for example, can be retrieved from the services catalog database 620 by the application gateway component 102 and transmitted to the external application 602. The external application 602, as described, can utilize this information to develop a new application, which can execute on a client 202, to access the generic interface facilitating late network binding functionality in the application 602. Additionally, the internal applications 104 can query the product catalog database 620, in one example, to determine functionality exposed by the application gateway component 102. In this regard, the internal applications 104 can develop routines and register with the application gateway component 102 interface to facilitate late network binding availability to the internal applications 104 or to an external application 602.

Figure 7:
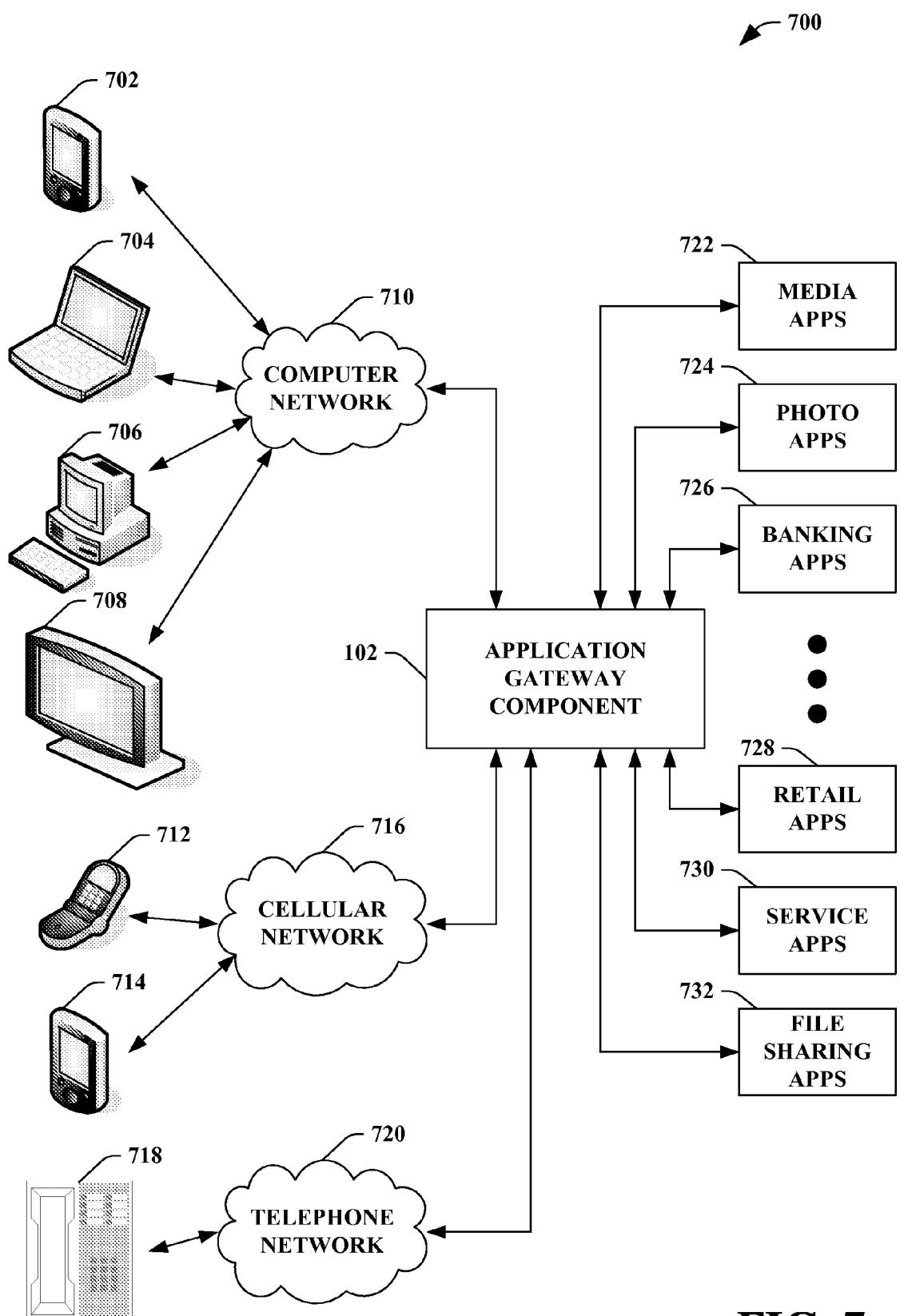
FIG. 7 illustrates a block diagram of an exemplary system that utilizes a centralized application gateway that communicates with various types of networks to provide late network binding for various types of devices.

Now referring to FIG. 7, a system 700 that facilitates providing late network binding over a plurality of networks is illustrated. The system 700 includes an application gateway component 102 that receives late network binding requests from various applications executing on various devices over one or more types of network. The system can also include a PDA 702, laptop computer 704, personal computer 706, and television 708 (or related set-top box) that communicate with the application gateway component 102, as described herein, over a computer network 710. It is to be appreciated that devices communicating over the computer network 710 to receive late network binding are not limited to those shown; substantially any device that can communicate over the computer network 710 can be utilized. In addition, the system 700 can also include a cellular phone 712 and/or smartphone 714 communicating with the application gateway component 102 over a cellular network 716 to receive late network binding to one or more applications, as described. Furthermore, the system 700 can include a telephone 718 communicating over a telephone network 720 (such as a public switched telephone network (PSTN), and/or the like) to receive late network binding from the application gateway component 102. It is to be appreciated that other types of networks, and related devices, are possible as well. The foregoing are included to facilitate explanation of the below example embodiments.

The application gateway component 102 can provide late network bindings to a plurality of network or web-based applications or services, such as one or more media applications 722, photo applications 724, banking applications 726, retail applications 728, service applications 730 (e.g., taxi, dry cleaners, etc.), file sharing applications 732, and/or other types of applications or services. In one example, media applications 722 can include a plurality of applications for sharing music, providing video on demand, controlling video access or other digital rights applications, and/or the like. In addition, a centralized application gateway component 102, as shown for example, can allow the devices to experience similar bindings for applications based on details of a user of the device, as described. In this regard, account information can be stored at the application gateway component 102, as described, such that similar bindings can be chosen for devices related to the same user. Thus, for example, a personal computer 706 can execute a video on demand application, which can access the application gateway component 102 (using generic interfaces provided) via computer network 710 to purchase a video from one of a plurality of available video on demand applications, as determined using a context of a user of the computer, as described above. A user can watch a portion of the video from the application classified in the media apps 722 on the personal computer 706. On the go, the user can utilize cellular phone 712, which can execute a video on demand application that similarly uses the generic interfaces exposed by the application gateway component 102. The application gateway component 102 can determine a context, as described, and bind the video on demand functionality to one or more media apps 722 related to the user. In one example, the selected media app can be the same one utilized to purchase the video from the personal computer 706 (or a related application).

In another example, the devices can have their own specific bindings based on device and/or access network type. For example, the cellular phone 712, in the above example, can access a mobile version of the application utilized by the personal computer 706 to stream the video on demand. The application gateway component 102, as described, makes the binding determination based on various aspects related to the user of the device, aspects of the device itself, and/or the like. Bindings can also be related to user subscription to the application gateway component 102, such as service level, and/or the like. It is to be appreciated that substantially limitless applications can utilize the application gateway component 102, as described herein. For example, one or more taxi cab hailing applications can be callable by the application gateway component 102, which implements generic taxi cab hailing functionality. One or more of the devices described can invoke the generic interface to hail a taxi cab. The application gateway component 102 can bind the device to an appropriate specific application. In one example, each taxi cab company can have a distinct application for hailing a cab, and indeed not all taxi cab companies operate in all cities. Thus, the application gateway component 102, as described, can retrieve aspects associated with the device or user thereof (such as subscriber address, location obtained from GPS on the device, etc.), which can be utilized in performing the binding. In this regard, a device in New York can be bound to a taxi cab company operating in that area and not just any taxi cab company.

Other examples include applications that support interactive gaming, turn-by-turn directions (which can be location and/or preference based as described in similar examples). In addition, binding, as described, can be based on environment such that, for example, traffic alerts can be provided over text message when not in the car or audibly (e.g., over a car stereo) when in the car. In another example, the application bound can be the same, but the output can vary based on determining an environmental context and/or leveraging one or more capabilities of the client device, as described. It is to be appreciated that many other examples are possible where the network applications expose interfaces or routines accessible by the application gateway component 102, as described.

FIGS. 8-11 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 8:
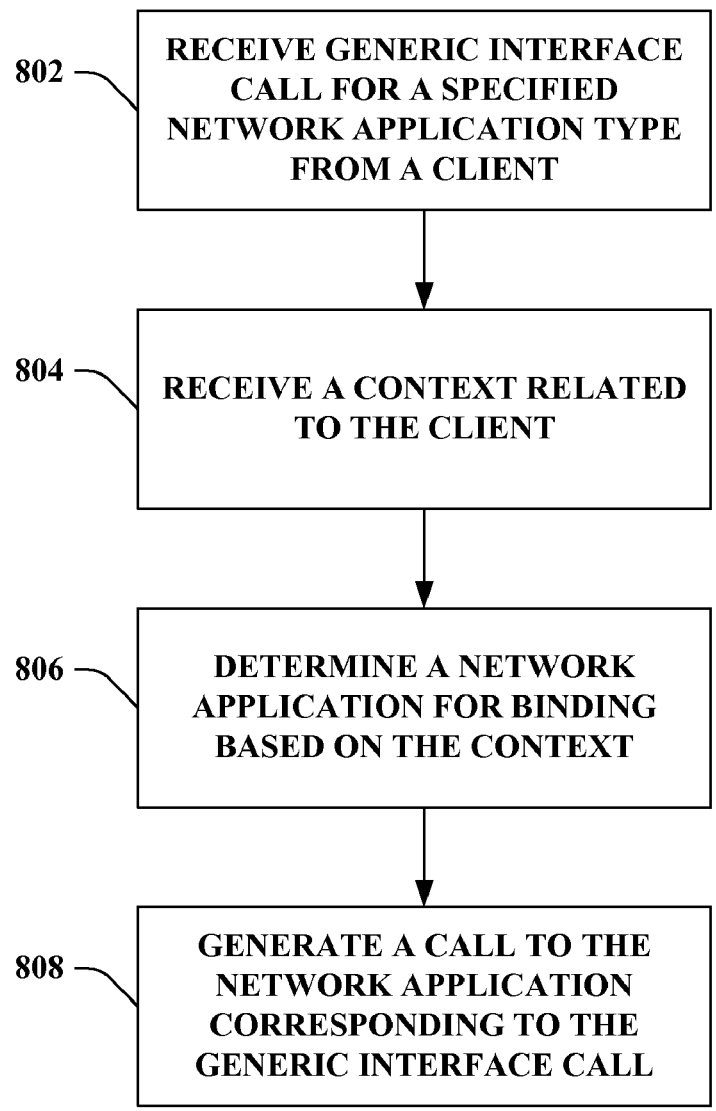
FIG. 8 illustrates an exemplary methodology for providing late network binding functionality to a client.

FIG. 8 illustrates a methodology 800 that facilitates providing late network binding to applications for generic application type functionality. At 802, a generic interface call is received from a client for a specified network application. The generic call can relate to functionality typically provided by applications of the type. For example, the network application type can relate to services that provide online photo printing functionality. The generic interface call, for example, can relate to uploading photos, creating photo albums, printing photos, and/or the like. At 804, a context related to the client can be received. As described, the context can comprise explicit indications of desired application bindings, information that can be used to infer such bindings (such as browsing history, purchase history, etc.), and/or the like.

At 806, a network application for binding can be determined based on the context. In one example, where the context comprises browsing history information, a determination can be made as to the best binding based on browsing history. For example, the browsing history can comprise requests to an online photo printing website—depending on many factors, such as time since last visit, frequency of visiting, current time of day, etc., the photo printing website can be utilized for the binding if such binding is available. At 808, a call to the network application can be generated corresponding to the generic interface call. For example, where the client has caused invocation of a photo print generic call, a call can be generated to the bound photo printing service website to print photos. In this regard, client applications can leverage a generic interface to access multiple related network or web-based applications or services. Moreover, different clients can be utilized by a user (e.g., mobile phone and computer) and can result in the same binding such that the user need not configure bindings for each client, for example.

Figure 9:
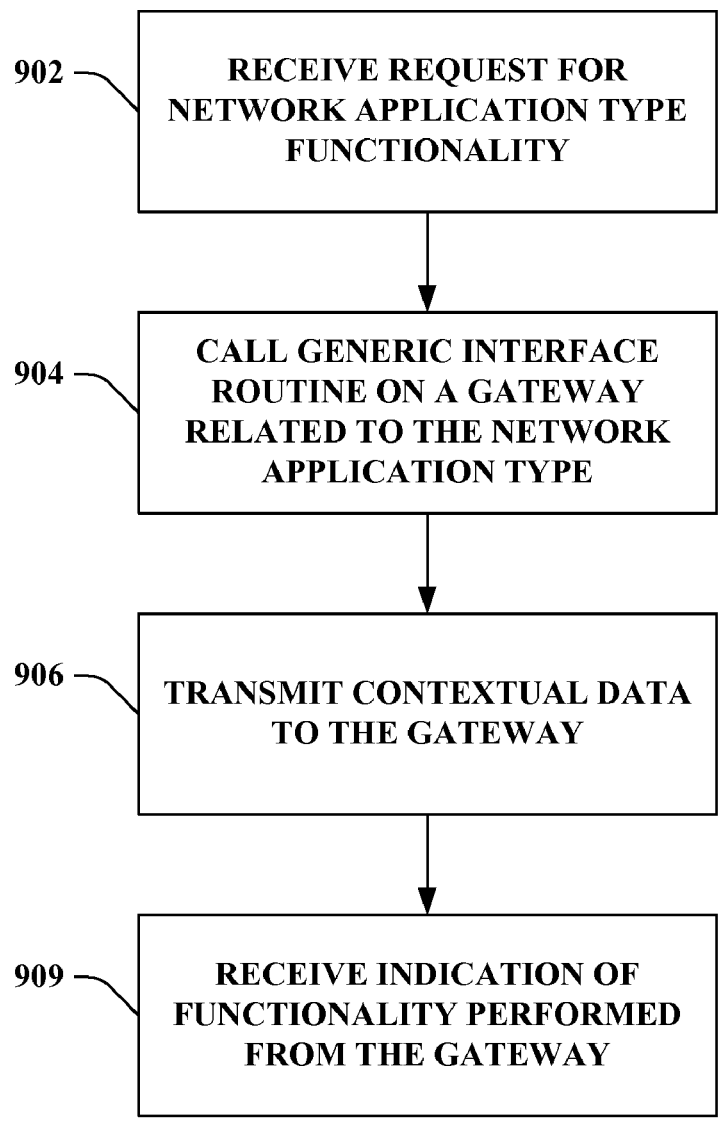
FIG. 9 illustrates an exemplary methodology that facilitates transmitting generic application requests along with contextual information to receive one or more late network bindings.

Referring now to FIG. 9, illustrated is a methodology 900 for invoking generic application type interfaces to receive late network binding related to the invocation. At 902, a request for network application type functionality can be received. For example, this can be received from an application call on a client; in one example, the call can result from action by a user on the client. At 904, a generic interface routine on a gateway related to the network application type can be called. As described, for example, this can relate to general functionality of related types of network applications, such as funds transfer for banking applications or services. At 906, contextual data can be transmitted to the gateway. For example, this data can relate to many aspects of the generic application call, including data related to a client or user as described, functionalities or specifications of the client, etc. As described, this can include demographic data of the user, location, age, services provided by the client, browsing history, biofeedback data, and/or the like. As discussed in detail above, the gateway can determine and/or utilize this information to generate a context, determine appropriate bindings, and invoke the appropriate applications. At 908, an indication of functionality performed can be received from the gateway.

Figure 10:
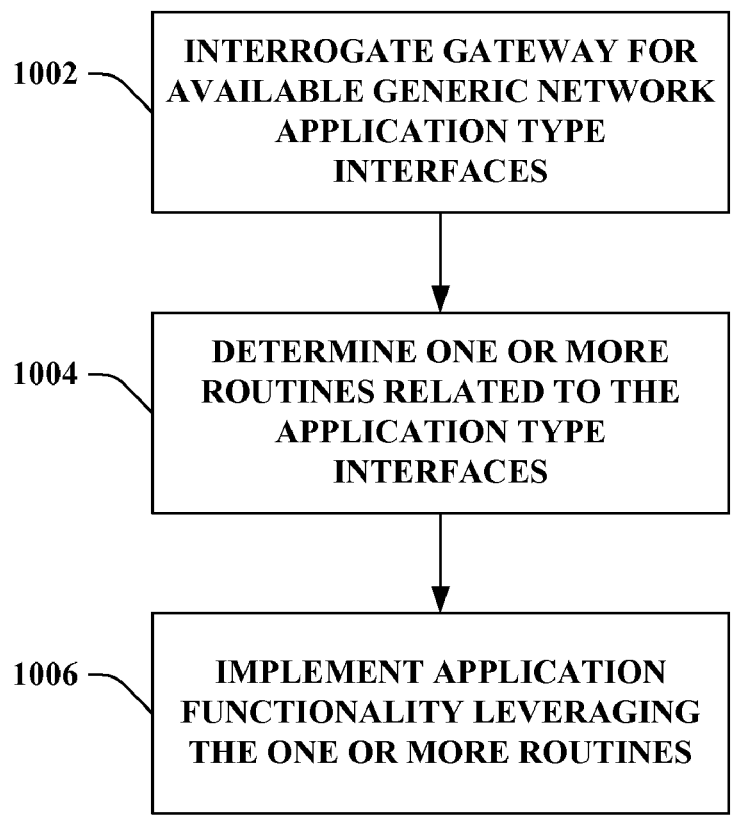
FIG. 10 illustrates an exemplary methodology for developing applications that leverage generic application type functionality to receive late network bindings.

Now turning to FIG. 10, a methodology 1000 that facilitates implementing applications that can leverage late network binding functionality to provide simplified access to a number of network or web-based applications or services is displayed. At 1002, a gateway can be interrogated for available generic network application type interfaces. This can allow an application, for example, to explore network application types supported by the gateway. At 1004, one or more routines related to the application type interfaces can be determined. For example, the application can subsequently determine functionalities for the application type that are supported by the gateway. Utilizing this information, at 1006, application functionalities can be implemented leveraging the one or more routines. Thus, for example, the application can implement functionality using the desired generic routines to provide late network binding to a variety of network or web-based applications or services.

Figure 11:
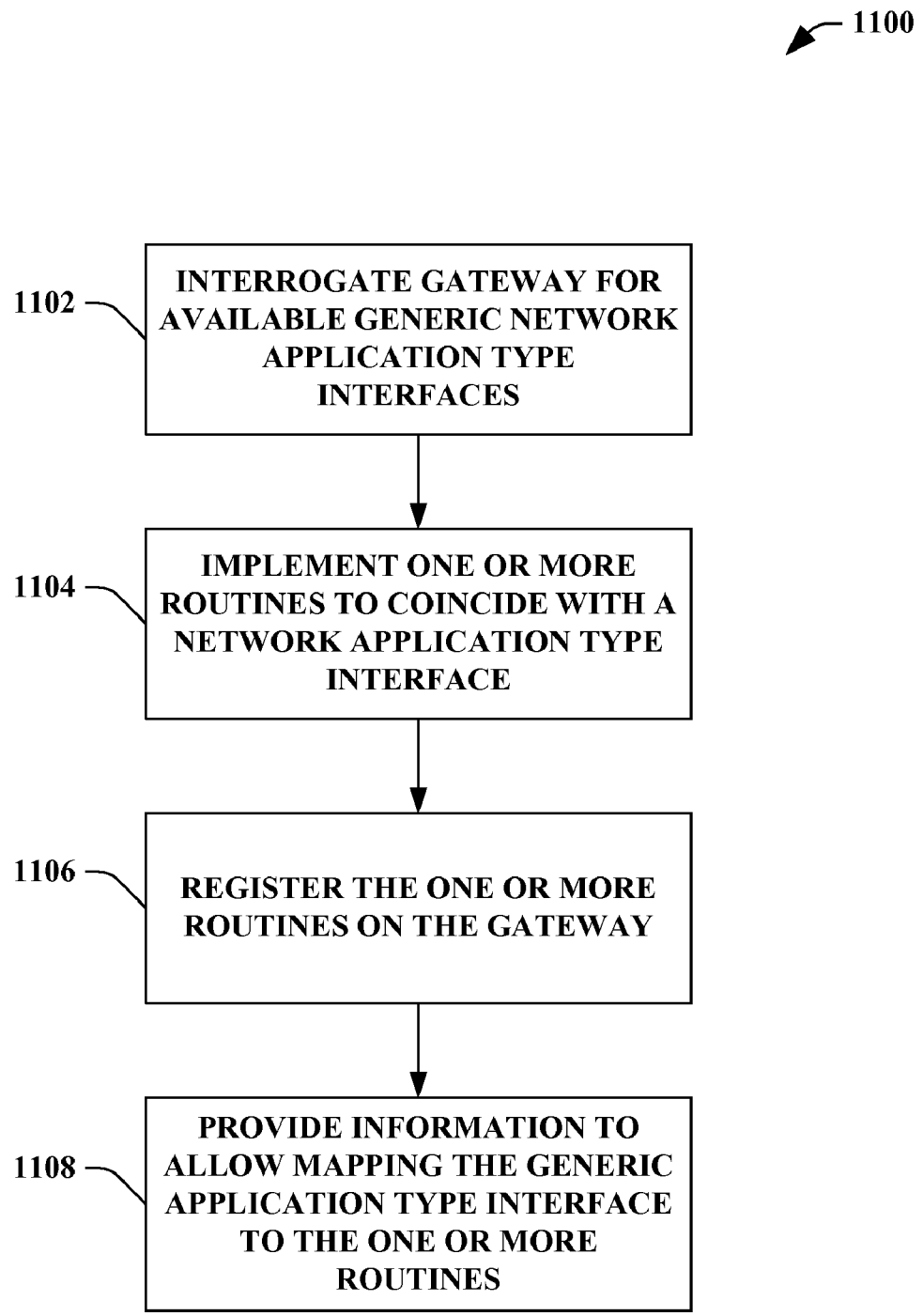
FIG. 11 illustrates an exemplary methodology for registering and implementing routines that coincide with the generic interface for binding thereto.

Referring to FIG. 11, a methodology 1100 is illustrated that allows network applications to register routines to participate in late network binding to the network application. At 1102, a gateway can be interrogated for available generic network application type interfaces. For example, the interfaces can be listed by application type such that given types can be searched. At 1104, one or more routines can be implemented to coincide with a network application type interface. Thus, where the desired application type is supported, routines can be implemented based on functionalities provided by the generic network application type interfaces. In one example, where the application type is a clothing retail store, the generic interface can expose a routine for searching a specified type of clothing. Routines can be implemented, in this regard, that correspond to the searching such that the gateway can utilize the routines when it receives invocation of the generic interface for searching the specified type of clothing. At 1106, the one or more routines can be registered on the gateway so the gateway can make the appropriate call when it receives the generic request from a client and determines the appropriate binding to be to the one or more routines. At 1108, information can be provided to allow mapping the generic application type interface to the one or more routines. For example, an appropriate website or trade name can be provided such that the application can evaluate context information for the client, as described, to search for the website or trade name.

Figure 12:
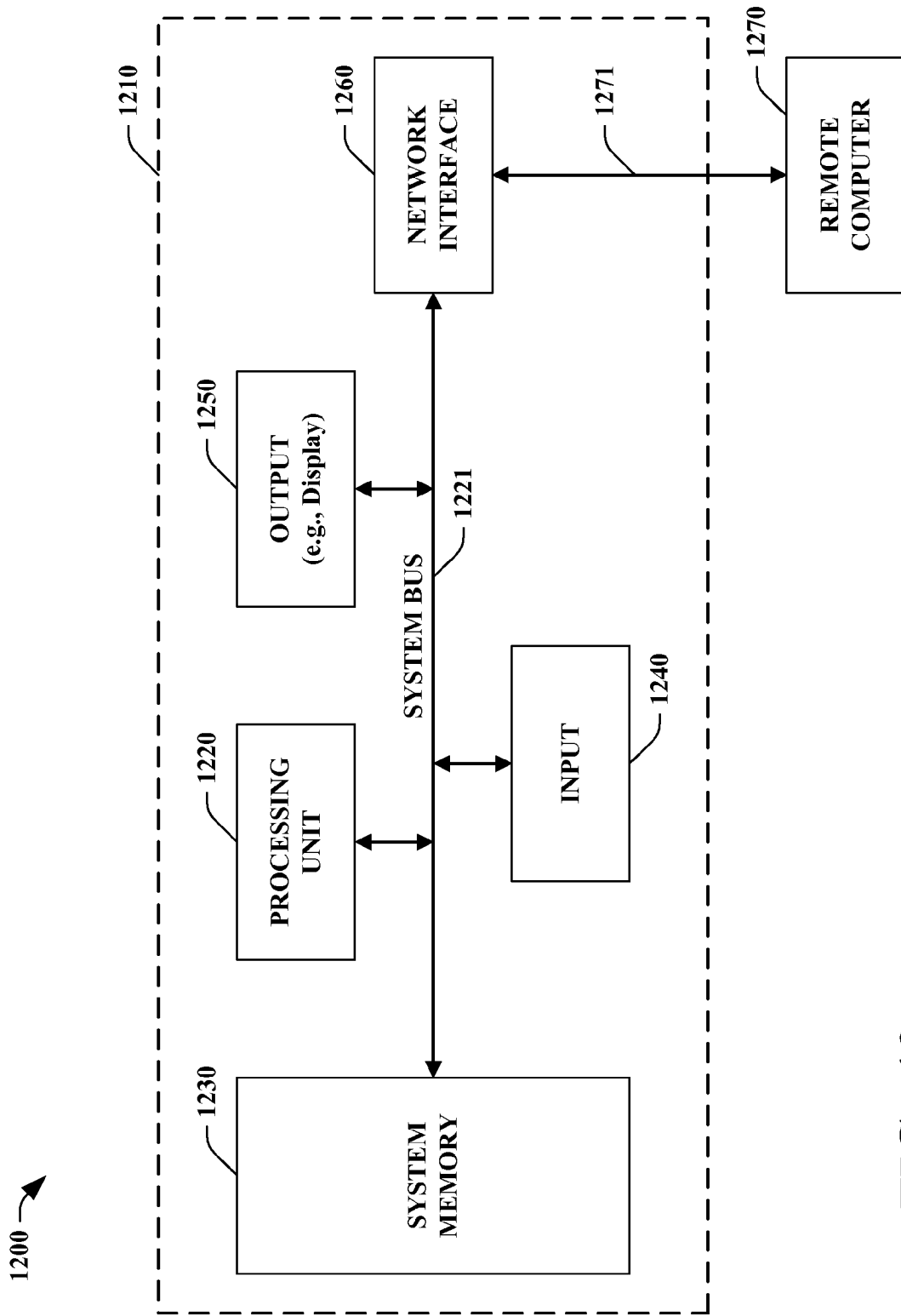
FIG. 12 is a block diagram of a computing system in which various aspects described herein can function.

In order to provide additional context for implementing various aspects of the claimed subject matter, FIG. 12 and the following discussion are intended to provide a brief, general description of a suitable computing environment in which the various aspects of the subject innovation may be implemented. For example, an application gateway component that provides late network binding functionality, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

Turning to FIG. 12, an example computing system or operating environment in which various aspects described herein can be implemented is illustrated. One of ordinary skill in the art can appreciate that handheld, portable and other computing devices and computing objects of all kinds are contemplated for use in connection with the claimed subject matter, e.g., anywhere that a network can be desirably configured. Accordingly, the below general purpose computing system described below in FIG. 12 is but one example of a computing system in which the claimed subject matter can be implemented.

Although not required, the claimed subject matter can partly be implemented via an operating system, for use by a developer of services for a device or object, and/or included within application software that operates in connection with one or more components of the claimed subject matter. Software may be described in the general context of computer executable instructions, such as program modules, being executed by one or more computers, such as client workstations, servers or other devices. Those skilled in the art will appreciate that the claimed subject matter can also be practiced with other computer system configurations and protocols.

FIG. 12 thus illustrates an example of a suitable computing system environment 1200 in which the claimed subject matter can be implemented, although as made clear above, the computing system environment 1200 is only one example of a suitable computing environment for a media device and is not intended to suggest any limitation as to the scope of use or functionality of the claimed subject matter. Further, the computing environment 1200 is not intended to suggest any dependency or requirement relating to the claimed subject matter and any one or combination of components illustrated in the example operating environment 1200.

With reference to FIG. 12, an example of a computing environment 1200 for implementing various aspects described herein includes a general purpose computing device in the form of a computer 1210. Components of computer 1210 can include, but are not limited to, a processing unit 1220, a system memory 1230, and a system bus 1221 that couples various system components including the system memory to the processing unit 1220. The system bus 1221 can be any of several types of bus structures including a memory bus or memory controller, a peripheral bus, and a local bus using any of a variety of bus architectures.

Computer 1210 can include a variety of computer readable media. Computer readable media can be any available media that can be accessed by computer 1210. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media can embody computer readable instructions, data structures, program modules or other data in a modulated data signal such as a carrier wave or other transport mechanism and can include any suitable information delivery media.

The system memory 1230 can include computer storage media in the form of volatile and/or nonvolatile memory such as read only memory (ROM) and/or random access memory (RAM). A basic input/output system (BIOS), containing the basic routines that help to transfer information between elements within computer 1210, such as during start-up, can be stored in memory 1230. Memory 1230 can also contain data and/or program modules that are immediately accessible to and/or presently being operated on by processing unit 1220. By way of non-limiting example, memory 1230 can also include an operating system, application programs, other program modules, and program data.

The computer 1210 can also include other removable/non-removable, volatile/nonvolatile computer storage media. For example, computer 1210 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 1221 through a non-removable memory interface such as an interface, and a magnetic disk drive or optical disk drive can be connected to the system bus 1221 by a removable memory interface, such as an interface.

A user can enter commands and information into the computer 1210 through input devices such as a keyboard or a pointing device such as a mouse, trackball, touch pad, and/or other pointing device. Other input devices can include a microphone, joystick, game pad, satellite dish, scanner, or the like. These and/or other input devices can be connected to the processing unit 1220 through user input 1240 and associated interface(s) that are coupled to the system bus 1221, but can be connected by other interface and bus structures, such as a parallel port, game port or a universal serial bus (USB). A graphics subsystem can also be connected to the system bus 1221. In addition, a monitor or other type of display device can be connected to the system bus 1221 via an interface, such as output interface 1250, which can in turn communicate with video memory. In addition to a monitor, computers can also include other peripheral output devices, such as speakers and/or a printer, which can also be connected through output interface 1250.

The computer 1210 can operate in a networked or distributed environment using logical connections to one or more other remote computers, such as remote computer 1270, which can in turn have media capabilities different from device 1210. The remote computer 1270 can be a personal computer, a server, a router, a network PC, a peer device or other common network node, and/or any other remote media consumption or transmission device, and can include any or all of the elements described above relative to the computer 1210. The logical connections depicted in FIG. 12 include a network 1271, such as a local area network (LAN) or a wide area network (WAN), but can also include other networks/buses. Such networking environments are commonplace in homes, offices, enterprise-wide computer networks, intranets and the Internet.

When used in a LAN networking environment, the computer 1210 is connected to the LAN 1271 through a network interface or adapter. When used in a WAN networking environment, the computer 1210 can include a communications component, such as a modem, or other means for establishing communications over the WAN, such as the Internet. A communications component, such as a modem, which can be internal or external, can be connected to the system bus 1221 via the user input interface at input 1240 and/or other appropriate mechanism. In a networked environment, program modules depicted relative to the computer 1210, or portions thereof, can be stored in a remote memory storage device. It should be appreciated that the network connections shown and described are non-limiting examples and that other means of establishing a communications link between the computers can be used.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate application programming interface (API), tool kit, driver code, operating system, control, standalone or downloadable software object, etc. which enables applications and services to use the binding techniques disclosed above. The claimed subject matter contemplates the use from the standpoint of an API (or other software object), as well as from a software or hardware object that operates according to the binding techniques in accordance with the claimed subject matter. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A computer implemented system that facilitates late network application binding, comprising:
    a request receiver component that receives one or more generic network application interface invocations from a client;
    a context component that establishes a context related to the client;
    a request generator component that creates a late network binding for the generic application interface invocation based at least in part on the context; wherein internal behavior of an application is alterable based on the context; and
    a user configuration component that employs the context to infer the late network binding specific to a web service of the network; wherein the late network binding is overridable by a choice of the client.

2. The computer implemented system of claim 1, the client is at least one of a cellular phone, a mobile device, a portable digital assistant (PDA), a smart phone, a laptop, a gaming device, a portable gaming device, a media player, a portable media player, a web browser, a machine, a computer, a portable computing device, or an application executing thereon.

3. The computer implemented system of claim 1, the request generator component formulates a request to at least one of a plurality of a network applications or services of a similar type based at least in part on the late network binding.

4. The computer implemented system of claim 3, the request comprises authentication information for the at least one network application or service based on the context.

5. The computer implemented system of claim 1, the context component comprises a history component that mines historical information related to a user of the client to facilitate developing the context.

6. The computer implemented system of claim 5, the context component develops the context to include one or more desired network applications based on previous behavior where the previous behavior includes web browsing history.

7. The computer implemented system of claim 1, the context determined by the context component includes an explicit indication of one or more desired late network bindings previously configured by a user.

8. The computer implemented system of claim 1, further comprising a client personalization component that utilizes one or more functions of the client to provide information related to the late network binding.

9. The computer implemented system of claim 1, further comprising a design repository component that maintains a list of application types and related generic interface routines.

10. The computer implemented system of claim 1, the request receiver component receives a disparate generic network application interface invocation from a disparate client of the same user and the request generator component determines the same late network binding for the disparate generic application interface invocation.

11. A computer-implemented method that facilitates late network binding comprising:
    invoking a generic application type interface for a request from a client to an application gateway of a network;
    analyzing historical data to generate a context for the request;
    publishing a new event via an indicating mechanism associated with an application, after an internal behavior of the application is altered; and
    inferring a late network application binding for the request based in-part on the context, wherein the late network application binding is specific to a web service of the network, and the late network application binding is overridable by a choice of the client.

12. The method of claim 11, further comprising transmitting a command to a network application or service corresponding to the late network application binding based at least in part on information in the context.

13. The method of claim 12, the context includes information regarding authentication credentials for the network application or service.

14. The method of claim 11, the context is a default context.

15. The method of claim 11, the context is received as a portion of a generic interface invocation.

16. The method of claim 11, further comprising applying a profile associated with the application to determine the context.

17. The method of claim 16, the profile is based on historical web browsing data and the determined context comprises at least one explicit late network binding application preference.

18. The method of claim 11, further comprising receiving the information regarding the client, comprising at least one explicit late network binding application preference, as part of a previous configuration step.

19. The method of claim 11, further comprising exposing a list of network application types for which generic interfaces are available for utilization by one or more applications.

20. A computer-implemented system that facilitates late network binding of generic application interface invocations, comprising:

means for invoking a generic application type interface for a request from a client to an application gateway of a network means for analyzing historical data to generate a context for the request;

means for inferring a late binding for the request based in-part on the context, the late binding specific to a web service of the network, the late binding being overridable by a specific choice of the client; and means for altering an internal behavior of an application based on the context.

* * * * *